(12) United States Patent
Bezner et al.

(10) Patent No.: US 9,605,585 B2
(45) Date of Patent: Mar. 28, 2017

(54) INTERNAL COMBUSTION ENGINE, IN PARTICULAR FOR A MOTOR VEHICLE, AND A METHOD FOR OPERATING SUCH AN INTERNAL COMBUSTION ENGINE

(71) Applicant: Daimler AG, Stuttgart (DE)

(72) Inventors: Martin Bezner, Walheim (DE);
Juergen Fischer, Munich (DE);
Helmut Gildein, Winterbach (DE);
Arnold Kaden, Remshalden (DE);
Dirk Sundheim, Urbach (DE)

(73) Assignee: Daimler AG, Stuttgart (DE)

( * ) Notice: Subject to any disclaimer, the term of this patent is extended or adjusted under 35 U.S.C. 154(b) by 275 days.

(21) Appl. No.: 14/378,416

(22) PCT Filed: Feb. 14, 2013

(86) PCT No.: PCT/EP2013/000419
§ 371 (c)(1),
(2) Date: Aug. 13, 2014

(87) PCT Pub. No.: WO2013/120607
PCT Pub. Date: Aug. 22, 2013

(65) Prior Publication Data
US 2015/0300240 A1 Oct. 22, 2015

(30) Foreign Application Priority Data
Feb. 14, 2012 (DE) .................. 10 2012 002 897

(51) Int. Cl.
*F02B 17/00* (2006.01)
*F02B 23/10* (2006.01)
(52) U.S. Cl.
CPC .......... *F02B 17/005* (2013.01); *F02B 23/101* (2013.01); *Y02T 10/125* (2013.01)

(58) Field of Classification Search
CPC ..... F02B 17/005; F02B 23/101; Y02T 10/125
See application file for complete search history.

(56) References Cited

U.S. PATENT DOCUMENTS 5,927,244 A 7/1999 Yamauchi et al.
6,748,917 B1 6/2004 Hoffmann et al.

FOREIGN PATENT DOCUMENTS

DE 199 11 023 C2 7/2001
DE 697 12 155 T2 12/2002
(Continued)

OTHER PUBLICATIONS

Japanese Office Action issued in counterpart Japanese Application No. 2014-556953 dated Aug. 4, 2015, with partial English translation (Four (4) pages).
(Continued)

*Primary Examiner* — Lindsay Low
*Assistant Examiner* — Kevin Lathers
(74) *Attorney, Agent, or Firm* — Crowell & Moring LLP

(57) ABSTRACT

A motor vehicle internal combustion engine has at least one combustion chamber delimited by at least one wall of the internal combustion engine, and at least one injector that is associated with the combustion chamber and that is at least partially accommodated in a receiving opening delimited by a first wall area of the wall extending at least essentially parallel to the axial direction of the injector The injector includes at least one injection opening that opens into the combustion chamber via the receiving opening, in the direction of the combustion chamber the first wall area being directly adjoined by a further wall area of the wall that extends at an angle to the axial direction and which delimits an at least essentially conical area of the receiving opening which expands toward the combustion chamber. Over its length relative to the radial direction of the injector, the further wall area is situated at a distance from the injector (Continued)

Figure 1:
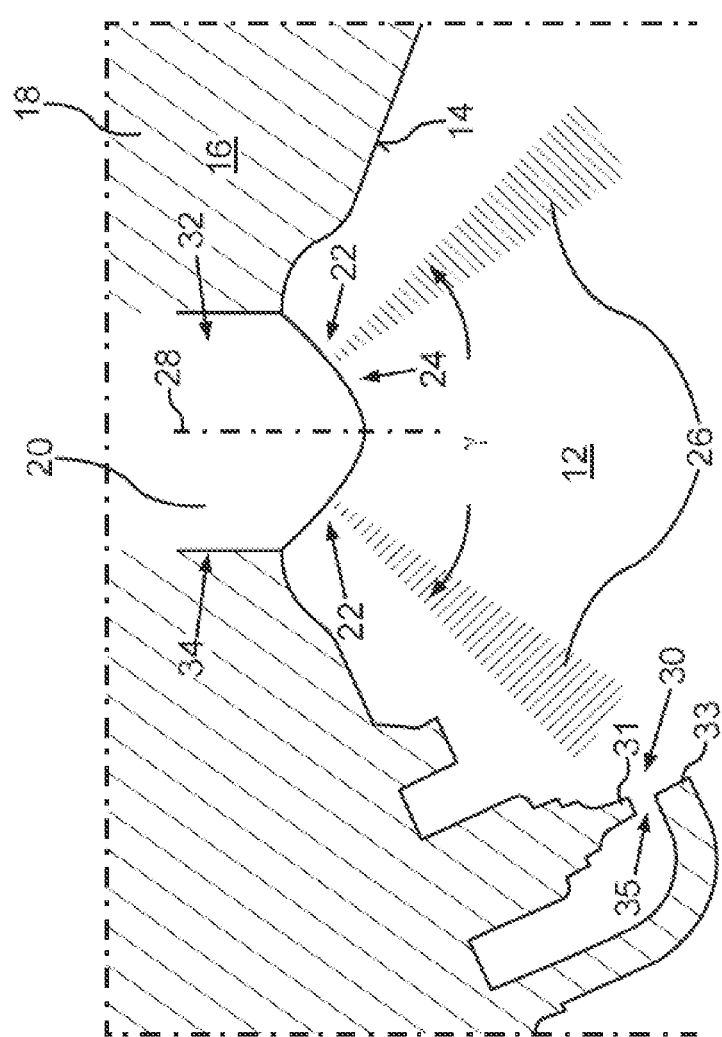

and in alignment with the injector, at least in places, and has a cone opening angle in a range of 50 degrees up to and including 90 degrees, the cone opening angle being smaller than a jet angle of the injection jet.

12 Claims, 3 Drawing Sheets

(56) References Cited

FOREIGN PATENT DOCUMENTS

| DE | 10 2007 012 508 A1 | 9/2008 | | |
|---|---|---|---|---|
| EP | 1 302 635 A2 | 4/2003 | | |
| EP | 1 481 160 B1 | 12/2004 | | |
| EP | 1 548 248 A2 | 6/2005 | | |
| FR | 2 836 697 A1 | 9/2003 | | |
| FR | 2 853 355 A1 | 10/2004 | | |
| FR | 2853355 A1 * | 10/2004 | ............ | F02B 17/005 |
| FR | 2 885 391 A1 | 11/2006 | | |
| JP | H06-81654 A | 3/1994 | | |
| JP | 2002-21569 A | 1/2002 | | |
| JP | 2005-518499 A | 6/2005 | | |
| JP | 2005-201062 A | 7/2005 | | |
| WO | WO 02/44536 A1 | 6/2002 | | |

OTHER PUBLICATIONS

International Search Report dated May 31, 2013 (Two (2) pages).
German-language Written Opinion dated May 31, 2013 (Five (5) pages).
German-language Office Action dated Sep. 11, 2012 (Six (6) pages).

* cited by examiner

INTERNAL COMBUSTION ENGINE, IN PARTICULAR FOR A MOTOR VEHICLE, AND A METHOD FOR OPERATING SUCH AN INTERNAL COMBUSTION ENGINE

BACKGROUND AND SUMMARY OF THE INVENTION

Exemplary embodiments of the invention relate to an internal combustion engine for a motor vehicle and a method for operating such an internal combustion engine.

German patent document DE 199 11 023 C2 discloses a direct-injection gasoline internal combustion engine having a combustion chamber delimited by a wall of the internal combustion engine, and having an injector associated with the combustion chamber. The injector is used for introducing fuel into the combustion chamber, and is at least partially accommodated in a receiving opening. The receiving opening is delimited by a wall area of the wall extending at least essentially parallel to the axial direction of the injector. The injector has at least one injection opening that opens into the combustion chamber via the receiving opening. This means that the fuel for operating the internal combustion engine may be introduced, in particular injected, into the combustion chamber via the injection opening in the injector and the receiving opening in the wall.

The injector is situated at least essentially in the center of the combustion chamber, and may inject the fuel into the combustion chamber with an at least essentially conical fuel jet or fuel spray. The injector itself is situated in the combustion chamber ceiling in such a way that due to the injection, an ignitable air-fuel mixture accumulates at a certain distance from a spark plug. This involves a spray-guided combustion process.

Internal combustion engines are known from European patent document EP 1 548 248 A2 and German patent document DE 697 12 155 T2, which have at least one combustion chamber delimited by at least one wall of the internal combustion engine and at least one injector which is associated with the combustion chamber. The particular injector is at least partially accommodated in a receiving opening. The receiving opening is delimited by a first wall area extending at least essentially parallel to the axial direction of the injector. The injector has at least one injection opening that opens into the combustion chamber via the receiving opening. In the direction of the combustion chamber, the first wall area is directly adjoined by a further wall area of the wall extending at an angle to the axial direction. The further wall area delimits an area of the receiving opening that expands at least essentially conically toward the combustion chamber. In addition, an at least essentially conical injection jet for introducing fuel for the internal combustion engine into the combustion chamber is achievable by means of the injector.

It has been shown that, especially for particularly small quantities of fuel injected by means of the injector, problems may result regarding the ignition stability and combustion stability, in particular in so-called stratified charge operation of the internal combustion engine.

Exemplary embodiments of the invention are directed to an internal combustion engine as well as a method for operating such an internal combustion engine of the type mentioned at the outset in such a way that particularly high combustion stability is achievable.

A first aspect of the invention relates to an internal combustion engine, in particular for a motor vehicle and in particular for a passenger vehicle. The internal combustion engine includes at least one combustion chamber, for example a cylinder, which is delimited by at least one wall of the internal combustion engine. In addition, the internal combustion engine includes at least one injector associated with the combustion chamber and which is at least partially accommodated in a receiving opening. The receiving opening is delimited by a first wall area of the wall extending at least essentially parallel to the axial direction of the injector. The receiving opening is designed, for example, as an at least essentially circular cylinder or straight circular cylinder, or is delimited in this form by the first wall area.

The injector has at least one injection opening that opens into the combustion chamber via the receiving opening. Fuel, in particular liquid fuel, for the internal combustion engine may thus be introduced, in particular injected and in particular directly injected, into the combustion chamber via the injection opening and the receiving opening.

In the direction of the combustion chamber, the first wall area is directly adjoined by a further wall area of the wall extending at an angle to the axial direction of the injector. The further wall area delimits an area of the receiving opening that expands at least essentially conically toward the combustion chamber. In addition, an at least essentially conical injection jet for introducing fuel for the internal combustion engine into the combustion chamber is achievable by means of the injector.

According to the invention, over its length relative to the radial direction of the injector, the further wall area is situated at a distance from the injector and in alignment with the injector, at least in places. In addition, the further wall area has a cone opening angle in a range of 50° up to and including 90°, the cone opening angle being smaller than a jet angle of the injection jet. The jet angle characterizes a cone opening angle of the at least essentially conical injection jet, and is referred to as the jet angle in order to satisfactorily conceptually differentiate it from the cone opening angle of the further wall area.

As a result of the cone opening angle of the further wall area being smaller than the jet angle of the injection jet, a mixture cloud composed of the injected fuel and the air supplied to the combustion chamber and which results from the injection of in particular liquid fuel, brought about by means of the injector, may be stabilized at the further wall area, and thus at the combustion chamber ceiling of the combustion chamber. In other words, due to this configuration of the further wall area, a convergent design of the surroundings of the injector in the combustion chamber is provided, so that the mixture cloud may be stabilized. A particularly advantageous and stable association and supply of the mixture cloud, for example at a spark plug associated with the combustion chamber, may thus be achieved, so that the mixture cloud, i.e., the mixture of the fuel and air, may be ignited very well by means of the spark and stably combusted. In this way the risk of misfires, in which the desired combustion of the air-fuel mixture in the combustion chamber does not occur, may also be kept particularly low.

Due to the appropriately configured receiving opening, a particularly ignitable air-fuel mixture and a particularly large quantity of the particularly ignitable air-fuel mixture reaches the spark plug. This is the case due to the fact that the mixture cloud may propagate particularly advantageously in the combustion chamber in a directionally stable manner.

The high combustion stability thus provided is particularly advantageous for the so-called stratified charge operation of the internal combustion engine, which may be carried out by means of the injector. Such stratified charge operation, in particular in the internal combustion engine designed as a gasoline engine, allows operation that is very low in emissions and fuel consumption, but imposes certain requirements in order to achieve stable combustion of the air-fuel mixture. These requirements may be met particularly well in the internal combustion engine according to the invention.

In stratified charge operation, the fuel is introduced into the combustion chamber by means of the injector in, for example, two or three injections in very rapid succession shortly before the upper ignition point. Typically, the penetration behavior of the subsequent injection is influenced by the preceding injection due to the induced flow, and the supply of an ignitable mixture to the spark plug is reduced. Especially for particularly small second and third injection quantities, which are advantageous for low emission values, the ignition stability and combustion stability may thus be adversely affected.

This problem is at least reduced in the internal combustion engine according to the invention. The flow influence of the main injection (the preceding injection) on the air-fuel mixture for the subsequent injection with a comparatively smaller injection quantity of fuel is particularly low, so that the mixture cloud propagates in a directionally stable manner. By means of the internal combustion engine according to the invention, a particularly advantageous spray-guided combustion process is thus provided, in which high combustion stability with only a low likelihood of misfires in the stratified charge operation of the gasoline engine with direct injection, and with an outwardly or inwardly injector in conjunction with injection times, is achievable for providing particularly low emissions.

In another advantageous embodiment of the invention, the further wall area extends over a length, relative to the axial direction of the injector, which is in a range of 3 mm up to and including 6 mm. Particularly advantageous flow conditions are thus achievable that result in particularly high combustion stability, and thus, a low likelihood of misfires.

It has been shown to be particularly advantageous when the first wall area rests at least indirectly against the injector. The injector is thus accommodated and held in the receiving opening in a particularly defined manner, and is not able to undesirably move relative to the wall, even at very high injection pressures.

Another embodiment is characterized in that a minimum distance between the further wall area and the injection jet which may be brought about by means of the injector when fuel is injected into the combustion chamber is in a range of 1 mm up to and including 4 mm. The propagation behavior of the injection jet and of the resulting air-fuel mixture is thus stabilized, resulting in particularly high combustion stability and a low likelihood of misfires.

In another embodiment of the invention, the internal combustion engine is designed as a gasoline engine. In particular for gasoline engines, stabilizing the mixture cloud plays an important role in enabling large quantities of ignitable mixture to be led to the spark plug, and consequently, achieving efficient, low-emission operation and keeping the risk of misfires low.

In another embodiment of the invention, stratified charge operation and/or homogeneous operation of the internal combustion engine may be carried out by means of the injector. The emissions as well as the fuel consumption of the internal combustion engine may thus be kept particularly low.

It has been shown to be particularly advantageous when a lateral surface of the injector on the outer peripheral side, which is designed at least essentially in the form of a straight circular cylinder, and the first wall area facing the combustion chamber end at the same height. In other words, the first wall area and the lateral surface of the injector on the outer peripheral side extend toward the combustion chamber to the same height. This results in particularly advantageous environmental conditions, so that the mixture cloud resulting from the injection of the fuel may be stabilized very well.

In another embodiment of the invention, the injector is designed as an outwardly opening or inwardly opening injector. Particularly high combustion stability may be achieved in this way.

Lastly, it has shown to be particularly advantageous when the further wall area is rotationally symmetrical with respect to a center axis of the injector. The wall area may thus be produced in a time- and cost-effective manner.

The injector is advantageously situated at least essentially centrally with respect to the combustion chamber. In other words, the center axis of the injector and a center axis of the combustion chamber coincide. This means that the center axes are in alignment.

A second aspect of the invention relates to a method for operating an internal combustion engine, in particular an internal combustion engine according to the invention. The internal combustion engine has at least one combustion chamber delimited by at least one wall of the internal combustion engine, and at least one injector which is associated with the combustion chamber and which is at least partially accommodated in a receiving opening which is delimited by a wall area of the wall which extends at least essentially parallel to the axial direction of the injector.

The injector has at least one injection opening which opens into the combustion chamber via the receiving opening, in the direction of the combustion chamber the first wall area being directly adjoined by a further wall area of the wall extending at an angle to the axial direction. An at least essentially conical area of the receiving opening that expands toward the combustion chamber is delimited by the further wall area.

Within the scope of the method, the injector brings about an at least essentially conical injection jet for introducing fuel for the internal combustion engine into the combustion chamber.

For achieving particularly high combustion stability, it is provided according to the invention that over its length relative to the radial direction of the injector, the further wall area is situated at a distance from the injector and in alignment with the injector, at least in places, and has a cone opening angle in a range of 50° up to and including 90°, the cone opening angle being smaller than a jet angle of the injection jet, and the internal combustion engine being operated in a stratified charge operation by means of the injector. Advantageous embodiments of the first aspect of the invention are considered as advantageous embodiments of the second aspect of the invention, and vice versa.

In stratified charge operation, which is typically also referred to as a stratified combustion process, high charge movements may result. Customarily, these high charge movements may have an adverse effect on the combustion stability. Due to the appropriate configuration of the combustion chamber, these charge movements may now be kept low, so that a mixture cloud composed of fuel and air may stably propagate in the combustion chamber and be led to a spark plug, for example, by means of which the mixture cloud may then be ignited.

If the internal combustion engine is a so-called supercharged internal combustion engine, which has at least one exhaust gas turbocharger for supplying the internal combustion engine with compressed air, this supercharging of the internal combustion engine typically results in very high charge movements. However, due to the configuration of the combustion chamber, a particularly robust stratified charge operation may be achieved, since the formation of an ignitable mixture at the spark plug may be ensured.

In addition, it is possible to operate the internal combustion engine at particularly high fuel pressures, for example in a range of 150 bar up to and including 300 bar, so that particularly efficient operation, and thus with low fuel consumption, is achievable.

The base area diameter of the at least essentially conical receiving opening is advantageously selected in such a way that the injection jet which may be brought about by means of the injector may propagate unhindered. In other words, it is provided that the second wall area does not hinder the propagation and formation of the injection jet.

BRIEF DESCRIPTION OF THE DRAWING FIGURES

Further advantages, features, and particulars of the invention result from the following description of preferred exemplary embodiments and with reference to the drawings. The features and feature combinations mentioned above in the description as well as the features and feature combinations mentioned below in the description of the figures and/or only shown in the figures may be used not only in the particular stated combination, but also in other combinations or alone without departing from the scope of the invention.

FIG. 1 is used to explain the background of the invention.

Figure 2:
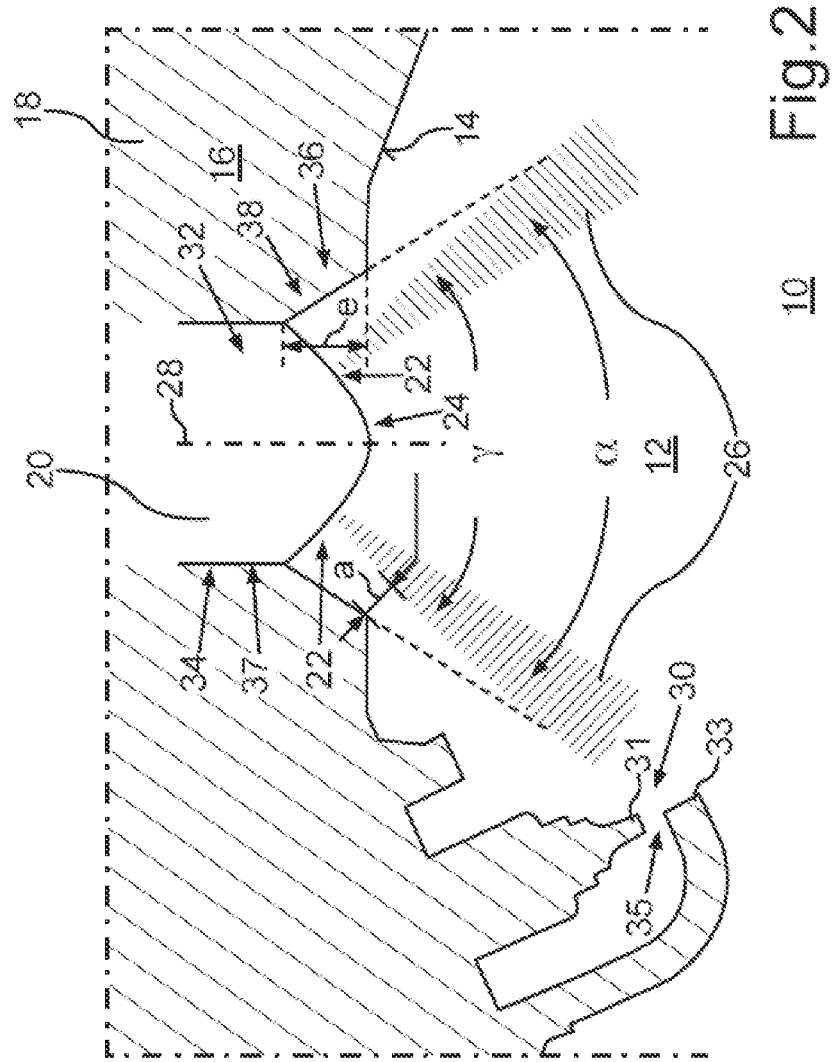
Figure 3:
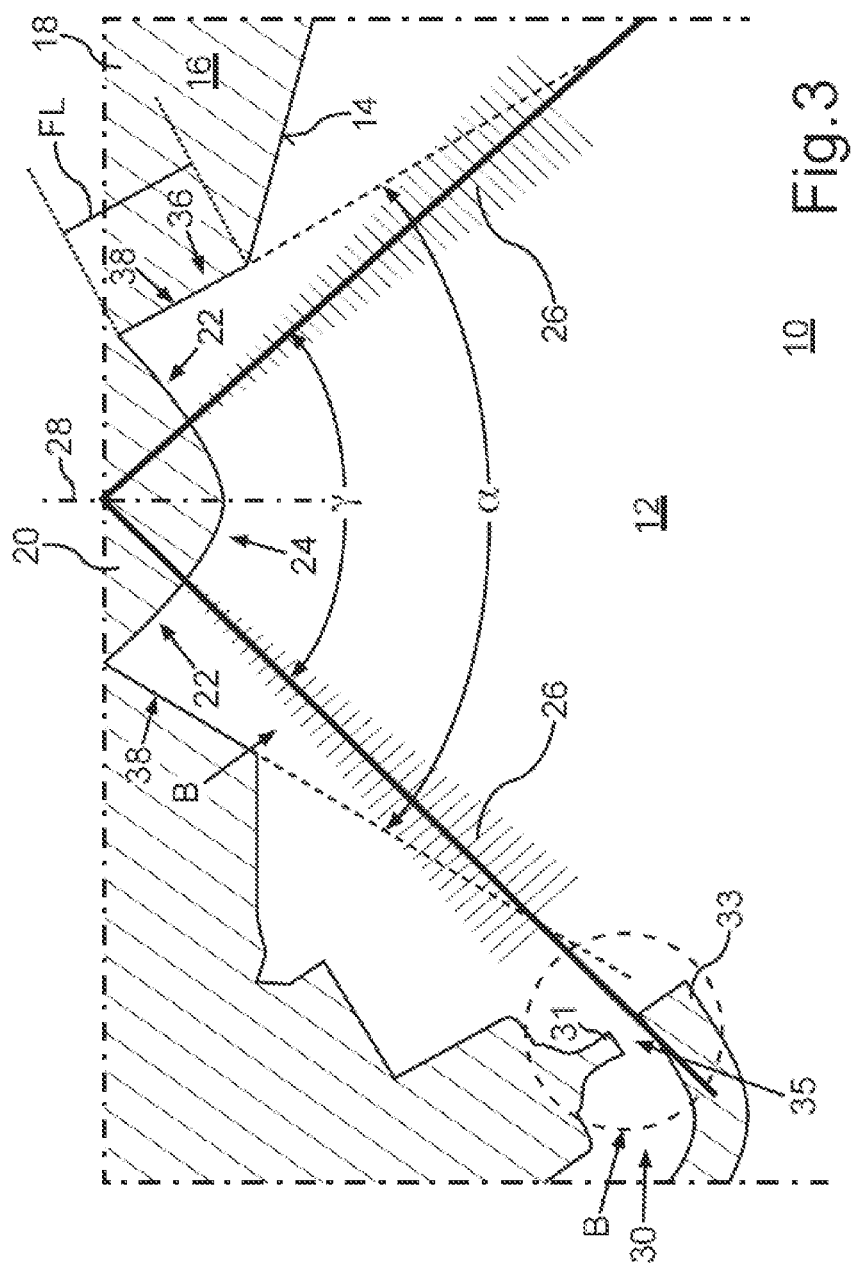

The drawings show the following:

FIG. 1 shows a detail of a schematic sectional view of an internal combustion engine designed as a reciprocating piston internal combustion engine, having at least one cylinder delimited by a combustion chamber ceiling of a cylinder head, and having an injector associated with the cylinder and is situated in a receiving opening in the cylinder head, fuel being injectable into the cylinder via the receiving opening by means of the injector;

FIG. 2 shows a detail of a schematic sectional view of an internal combustion engine designed as a reciprocating piston internal combustion engine according to a first embodiment, in which the receiving opening is delimited at least by a first wall area and a further wall area which adjoins toward the cylinder, an at least essentially conical area of the receiving opening being delimited by the further wall area, and a cone opening angle of the further wall area being smaller than a jet angle of an at least essentially conical injection jet that may be brought about by means of the injector; and FIG. 3 shows a detail of a schematic sectional view of the reciprocating piston internal combustion engine according to FIG. 2 in a second embodiment.

Identical or functionally equivalent elements are provided with the same reference numerals in the figures.

DETAILED DESCRIPTION

FIG. 1 shows an internal combustion engine 10 designed as a reciprocating piston internal combustion engine for a motor vehicle, for example a passenger vehicle. A combustion chamber 12 of the internal combustion engine 10 is apparent in FIG. 1. The internal combustion engine 10 may have a plurality of such combustion chambers 12. In the present case, the combustion chamber 12 is designed as a cylinder in which combustion processes take place.

The combustion chamber 12 is delimited at the top by a combustion chamber ceiling 14 in the vertical direction of the internal combustion engine. The combustion chamber ceiling 14 is formed, for example, by a wall 16 of a cylinder head 18 of the internal combustion engine 10. The cylinder head 18 is connected, for example, to a crankcase of the internal combustion engine 10. A crankshaft of the internal combustion engine 10 is supported on the crankcase so as to be rotatable relative to the crankcase about a rotational axis.

The combustion chamber 12 is laterally delimited by cylinder walls, not discernible in FIG. 1, which are formed by the crankcase, which is designed as a cylinder crankcase. The combustion chamber 12 is delimited at the bottom by a piston of the internal combustion engine 10 in the vertical direction of the internal combustion engine 10. The piston is accommodated in the combustion chamber 12 so as to be translationally movable relative to the combustion chamber ceiling 14, and is articulatedly connected to a connecting rod via a piston pin. The connecting rod in turn is articulatedly connected to a crank pin of the crankshaft. Translatory up-and-down movements of the piston in the combustion chamber 12 may be converted into a rotary movement of the crankshaft about its rotational axis via these articulated connections.

An injector 20 is associated with the combustion chamber 12. The injector 20 is typically also referred to as an injection valve or injection element. Liquid fuel for operating the internal combustion engine 10 may be directly injected into the combustion chamber 12 by means of the injector 20. For this purpose, the injector 20 includes at least one injection opening 22 in an injection nozzle 24 of the injector 20, illustrated in a very schematic manner, the at least one injection opening 22 opening into the combustion chamber 12.

FIG. 1 schematically illustrates an injection jet, denoted overall by reference numeral 26, which may be brought about by means of the injector 20. This means that liquid fuel is directly injectable into the combustion chamber 12 by means of the injector 20, forming the injection jet 26. As is apparent from FIG. 1, the injection jet 26 composed of fuel, which may be brought about by means of the injector 20, is at least essentially conical, and has a jet angle $\gamma$. The jet angle $\gamma$ is thus a cone opening angle of the at least essentially conical injection jet 26. In addition, FIG. 1 shows a center axis 28 of the injector 20. The center axis 28 coincides with a center axis of the injection jet 26 and of the combustion chamber 12. In other words, the respective center axes of the injector 20, of the combustion chamber 12, and of the injection jet 26 are in alignment.

A spark plug 30 by means of which an air-fuel mixture, i.e., a mixture cloud composed of fuel and air, is ignitable in the combustion chamber 12 is also associated with the combustion chamber 12. In addition to the fuel, during operation of the internal combustion engine 10 air is supplied to the combustion chamber 12 via an intake tract and intake channels in the cylinder head 18. The air may thus mix with the fuel that is directly injected into the combustion chamber 12 by means of the injector 20, preferably forming an ignitable air-fuel mixture, i.e., the mixture cloud. The air-fuel mixture or the mixture cloud is ignitable by means of the spark plug 30 for initiating combustion of the air-fuel mixture. For igniting the air-fuel mixture, at least one ignition spark, which is thus formed at a so-called ignition spark point 35, forms between two electrodes 31, 33 of the spark plug 30. The injection openings 22 in the injector 20 are each so-called injector injection points at which the fuel is injected into the combustion chamber 12.

With reference to FIG. 1, it is also apparent that the injector 20 is at least partially accommodated in a receiving opening 32 in the cylinder head 18. The receiving opening 32 is delimited by a wall area 34 of the wall 16 of the cylinder head 18 extending at least essentially parallel to the axial direction, i.e., parallel to the center axis 28 of the injector 20. The wall area 34 delimits an area of the receiving opening 32, which is designed at least essentially in the form of a straight circular cylinder.

For providing particularly high combustion stability and a resulting particularly low risk of misfires of the internal combustion engine 10, an internal combustion engine designed as a reciprocating piston internal combustion engine for a motor vehicle, in particular a passenger vehicle, according to a first embodiment is shown in FIG. 2. As is apparent from FIG. 2, in an area 36 around the injector 20 the combustion chamber ceiling 14 is lowered by 3 mm to 6 mm compared to the combustion chamber ceiling 14 according to FIG. 1. In addition, the receiving opening 32 has an at least essentially conical shape in the area 36, and has a design which expands in the direction of the combustion chamber ceiling 14.

This is achieved by a further wall area 38 of the wall 16. The further wall area 38 directly adjoins the first wall area 34 in the direction of the combustion chamber 12, i.e., toward the combustion chamber 12, and extends at an angle to the axial direction and thus at an angle to the center axis 28 of the injector 20. In the present case, the first wall area 34 rests directly against the injector 20. In contrast, the further wall area 38 is situated at a distance from the injector 20 in the radial direction, i.e., transverse to the center axis 28, and in alignment with the injector 20, at least in places. Relative to the axial direction, i.e., relative to a direction extending parallel to the center axis 28, the further wall area 38 extends in a range of 3 mm up to and including 6 mm in the direction of the combustion chamber 12, this extension being denoted as length e of the further wall area 38.

The further wall area 38 has a cone opening angle α which is in a range of 50° up to and including 90°. In addition, a minimum distance a between the further wall area 38 and the injection jet 26 is in a range of 1 mm up to and including 4 mm.

In FIG. 2 it is also apparent that the injector 20 has a lateral surface 37 on the outer peripheral side that is designed at least essentially in the form of a straight circular cylinder. This lateral surface 37 on the outer peripheral side that is designed at least essentially in the form of a straight circular cylinder is in alignment with the first wall area 34 in the radial direction of the injector 20. The first wall area 34 ends at the end of the at least essentially cylindrical lateral surface 37 on the outer peripheral side. In other words, the lateral surface 37 on the outer peripheral side and the first wall area 34 facing the combustion chamber 12 are situated at the same height. This means that the lateral surface 37 on the outer peripheral side and the first wall area 34 facing the combustion chamber 12 in the axial direction of the injector 20 end at the same height.

As is also apparent from FIG. 2, the injection jet 26 has a so-called hollow cone jet characteristic. This means that the injection jet 26 is designed at least essentially in the form of a hollow cone. This is achievable, for example, in that for inwardly opening injectors the injection openings 22 in the injection nozzle 24 are situated at a distance from one another and are situated on respective sides of the injector 20 that face away from one another, so that via the injection openings 22, respective injection jet portions are injected in such a way that a hollow cone is formed as the injection jet 26. For outwardly opening injectors, the injection jet 26 is injected as a hollow cone by means of an annular circumferential injection opening 22 which may be opened up. The jet angle γ is advantageously in a range of 75° up to and including 90°. The jet angle γ is thus a cone opening angle of the at least essentially conical or hollow conical injection jet 26.

As is apparent from FIG. 2 and in particular from FIG. 3, the cone opening angle α of the further wall area 38 is smaller than the jet angle γ of the injection jet 26. As a result, the further wall area 38 is inclined with respect to the injection jet 26, so that the annular passage between the further wall area 38 and the hollow cone of the injection jet 22 or injection jets 22 is narrowed, as a result of which the injection jet 26 initially emerging from the injection opening 22, or the injection jets 26 initially emerging from the injection openings 22, is/are shielded by the charge movement in the combustion chamber and by the influence of the preceding injections. The mixture cloud may thus be stabilized particularly well at the combustion chamber ceiling 14, so that a particularly large quantity of ignitable mixture may propagate toward the spark plug 30. In other words, this configuration of the combustion chamber ceiling 14 provides flow guidance of the injection jet 26, so that a flow influence of a main injection or a preceding injection of fuel into the combustion chamber 12 on the mixture of a subsequent injection is particularly low. As a result, the mixture cloud propagates in a directionally stable manner, so that a particularly high proportion of ignitable air-fuel mixture may reach the spark plug 30 and be ignited.

This is particularly advantageous in a so-called stratified charge operation of the internal combustion engine 10 having a plurality, i.e., at least two, successive injections of fuel with only very low fuel quantities. The internal combustion engine 10, which is designed as a gasoline engine, for example, may thus be operated with particularly low emissions and with very low fuel consumption, while at the same time achieving high combustion and running stability of the internal combustion engine 10.

FIG. 3 shows the internal combustion engine 10 according to FIG. 2 in a second embodiment. The stabilization of the mixture cloud due to the appropriate configuration of the combustion chamber ceiling 14 is particularly apparent in areas B in FIG. 3. A convergent design of the injector surroundings is provided due to the appropriate configuration of the combustion chamber ceiling 14, since the jet angle γ, also referred to as the spray angle, is larger than a combustion chamber ceiling angle in the form of the cone opening angle α. A so-called guide length of the further wall area 38 is denoted by reference character FL in FIG. 3. The ratio of the guide length FL to a distance between one of the above-mentioned injector injection points and the ignition spark point 35 is preferably in a range of 0.2 up to and including 0.35.

The mixture cloud may propagate in a particularly stable manner due to the appropriate configuration of the combustion chamber ceiling 14, so that a particularly pronounced stratified charge operation is achievable. Multiple injections of fuel may thus be brought about by means of the injector 20. For example, two to five injections with pause times in a range of 100 to 1000 μs are carried out. In other words, there is a pause in a range of 100 to 1000 μs between two successive injections.

In addition, the further wall area 38 is at least essentially rotationally symmetrical with respect to the center axis 28, and may thus be easily and cost-effectively produced. Furthermore, the injector 20 is mounted at least essentially centrally with respect to the combustion chamber 12. This means that the respective center axes of the combustion chamber 12 and of the injector 20 are at least essentially in alignment with one another. It is also conceivable to incline the center axis 28 of the injector 20 with respect to the center axis of the combustion chamber 12, provided that the center axes of the combustion chamber 12, of the injection jet 26, and of the wall 38 are essentially in alignment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A motor vehicle internal combustion engine, comprising:
    a combustion chamber delimited by a wall of the internal combustion engine; and
    an injector associated with the combustion chamber,
    wherein the injector is at least partially accommodated in a receiving opening delimited by a first wall area of the wall extending at least essentially parallel to an axial direction of the injector,
    wherein the injector has at least one injection opening that opens into the combustion chamber via the receiving opening,
    wherein in a direction of the combustion chamber the first wall area is directly adjoined by a further wall area of the wall that extends at an angle to the axial direction and which delimits an at least essentially conical area of the receiving opening expanding toward the combustion chamber,
    wherein the injector is configured to introduce a conical injection jet of fuel for the internal combustion engine into the combustion chamber unimpeded by the further wall area,
    wherein over a length of the further wall relative to a radial direction of the injector, the further wall area is situated at a distance from the injector and has a cone opening angle in a range of 50 degrees up to and including 90 degrees, the cone opening angle being smaller than a jet angle of the injection jet.

2. The internal combustion engine of claim 1, wherein the further wall area extends over a length, relative to the axial direction of the injector, which is in a range of 3 millimeters up to and including 6 millimeters.

3. The internal combustion engine of claim 1, wherein the first wall area rests against the injector.

4. The internal combustion engine of claim 1, wherein a minimum distance between the further wall area and the injection jet brought about by the injector for injecting fuel for the internal combustion engine into the combustion chamber is in a range of 1 millimeter up to and including 4 millimeters.

5. The internal combustion engine of claim 1, wherein the internal combustion engine is a gasoline engine.

6. The internal combustion engine of claim 1, wherein a stratified charge operation or a homogeneous operation of the internal combustion engine is performed by means of the injector.

7. The internal combustion engine of claim 1, wherein a lateral surface of the injector on an outer peripheral side, which is a straight circular cylinder, and the first wall area facing the combustion chamber end at a same height.

8. The internal combustion engine of claim 1, wherein the injector is an outwardly opening or inwardly opening injector.

9. The internal combustion engine of claim 1, wherein the further wall area is rotationally symmetrical with respect to a center axis of the injector.

10. The internal combustion engine of claim 1, wherein a distal-most portion of the injector extends beyond the first wall area of the wall in the direction of the combustion chamber.

11. A method for operating a motor vehicle internal combustion engine, comprising a combustion chamber delimited by a wall of the internal combustion engine and an injector associated with the combustion chamber, wherein the injector is at least partially accommodated in a receiving opening delimited by a first wall area of the wall extending at least essentially parallel to an axial direction of the injector, wherein the injector has at least one injection opening that opens into the combustion chamber via the receiving opening, wherein in a direction of the combustion chamber the first wall area is directly adjoined by a further wall area of the wall that extends at an angle to the axial direction and which delimits an at least essentially conical area of the receiving opening expanding toward the combustion chamber, wherein the injector is configured to introduce a conical injection jet of fuel for the internal combustion engine into the combustion chamber unimpeded by the further wall area, wherein over a length of the further wall relative to a radial direction of the injector, the further wall area is situated at a distance from the injector and has a cone opening angle in a range of 50 degrees up to and including 90 degrees, the cone opening angle being smaller than a jet angle of the injection jet;
    comprising the step of operating the internal combustion engine in a stratified charge operation by means of the injector.

12. The method of claim 11, wherein a distal-most portion of the injector extends beyond the first wall area of the wall in the direction of the combustion chamber.

* * * * *